(12) United States Patent
Bryant-Rich

(10) Patent No.: US 8,386,723 B2
(45) Date of Patent: Feb. 26, 2013

(54) SYSTEM AND METHOD OF HOST REQUEST MAPPING

(75) Inventor: Donald Ray Bryant-Rich, Haifa (IL)

(73) Assignee: Sandisk IL Ltd., Kfar Saba (IL)

( * ) Notice: Subject to any disclaimer, the term of this patent is extended or adjusted under 35 U.S.C. 154(b) by 751 days.

(21) Appl. No.: 12/369,408

(22) Filed: Feb. 11, 2009

(65) Prior Publication Data

US 2010/0205350 A1    Aug. 12, 2010

(51) Int. Cl.
*G06F 13/00* (2006.01)
(52) U.S. Cl. ........................................ 711/154; 711/103
(58) Field of Classification Search .................. 711/103, 711/154
See application file for complete search history.

(56) References Cited

U.S. PATENT DOCUMENTS

| | | | |
|---|---|---|---|
| 6,148,354 A | 11/2000 | Ban et al. | |
| 6,327,640 B1 | 12/2001 | Gittinger et al. | |
| 7,334,077 B2 | 2/2008 | Nassar | |
| 2004/0267987 A1 | 12/2004 | Deng et al. | |
| 2006/0208247 A1* | 9/2006 | Barlow et al. | 257/1 |
| 2007/0033327 A1* | 2/2007 | Sinclair | 711/103 |
| 2007/0136501 A1 | 6/2007 | Chang et al. | |
| 2008/0293449 A1* | 11/2008 | Barlow et al. | 455/556.1 |
| 2009/0077273 A1* | 3/2009 | Rai et al. | 710/26 |

FOREIGN PATENT DOCUMENTS

| | | |
|---|---|---|
| DE | 102006054025 A1 | 5/2008 |
| WO | 2007138021 A1 | 12/2007 |

OTHER PUBLICATIONS

Rich, Donald, "Authentication in Transient Storage Device Attachments", http://www.computer.org/portal/site/computer/menuitem. eb7d7 . . . , Apr. 2007, 3 pages.

(Continued)

*Primary Examiner* — Reba I Elmore
(74) *Attorney, Agent, or Firm* — Toler Law Group, PC

(57) ABSTRACT

Systems and methods for reading data are disclosed. In a particular embodiment, a data storage device includes a host interface that is adapted to couple the data storage device to a host. The host includes memory that is addressable by a host memory address space. The data storage device also includes a device address space that is independent from the host memory address space. The device address space includes a first address region and a second address region, where the second address region is distinct from the first address region. The data storage device also includes a non-volatile memory array and a controller coupled to the non-volatile memory array and further coupled to a mapped device. The controller is adapted to, in response to a first request from the host for access to the first address region of the device address space, perform a memory access operation at the non-volatile memory array. The controller is also adapted to, in response to a second request from the host for access to the second address region of the device address space, map the second request to the mapped device.

40 Claims, 7 Drawing Sheets

OTHER PUBLICATIONS

Thibadeau, Robert, "Trusted Computing for Disk Drives and Other Peripherals", IEEE Computer Society, 2006, pp. 26-33.

Norman, Kelly R., "Encryption of Computer Peripheral Devices", School of Technology, Brigham Young University, Apr. 2006, 111 pages.

International Search Report and Written Opinion issued in International Patent Application No. PCT/US2010/020527 dated Nov. 2, 2010, 19 pages.

Invitation to Pay Additional Fees and, Where Applicable, Protest Fee and Partial International Search received in corresponding PCT Application No. PCT/US2010/020527 from the International Searching Authority (EPO) mailed Jul. 21, 2010, 7 pages.

Extended European Search Report issued by the European Patent Office on Feb. 23, 2012 in European Application No. 11187453.3, 8 pages.

* cited by examiner

SYSTEM AND METHOD OF HOST REQUEST MAPPING

FIELD OF THE DISCLOSURE

The present disclosure is generally related to mapping host memory access requests to device peripheral commands.

BACKGROUND

Non-volatile memory devices, such as universal serial bus (USB) flash memory devices or removable storage cards that hold data between power cycles, have allowed for increased portability of data and software applications. When multiple devices are to be accessible to a host, such as a memory array and a switch or a button in a removable memory card, the memory card may implement a Mass Storage Class (MSC) for the memory array and a Human Interface Device (HID) Class for the switch or button. Enabling host access to multiple USB devices of a product typically increases a number of USB endpoints used by the product and a number of buffers in the product.

SUMMARY

Systems and methods of mapping a host access request are disclosed. The host access request may be identified as a memory access request corresponding to a memory address that is mapped to a device other than a memory. For example, the memory access request may be mapped to a peripheral device such as a switch or bus controller within a data storage device, or may be mapped to an external device that is external to a data storage device. In a Universal Serial Bus (USB) implementation, the mapping may enable the host to access or to control the mapped devices without implementing additional USB device classes.

DETAILED DESCRIPTION

Figure 1:
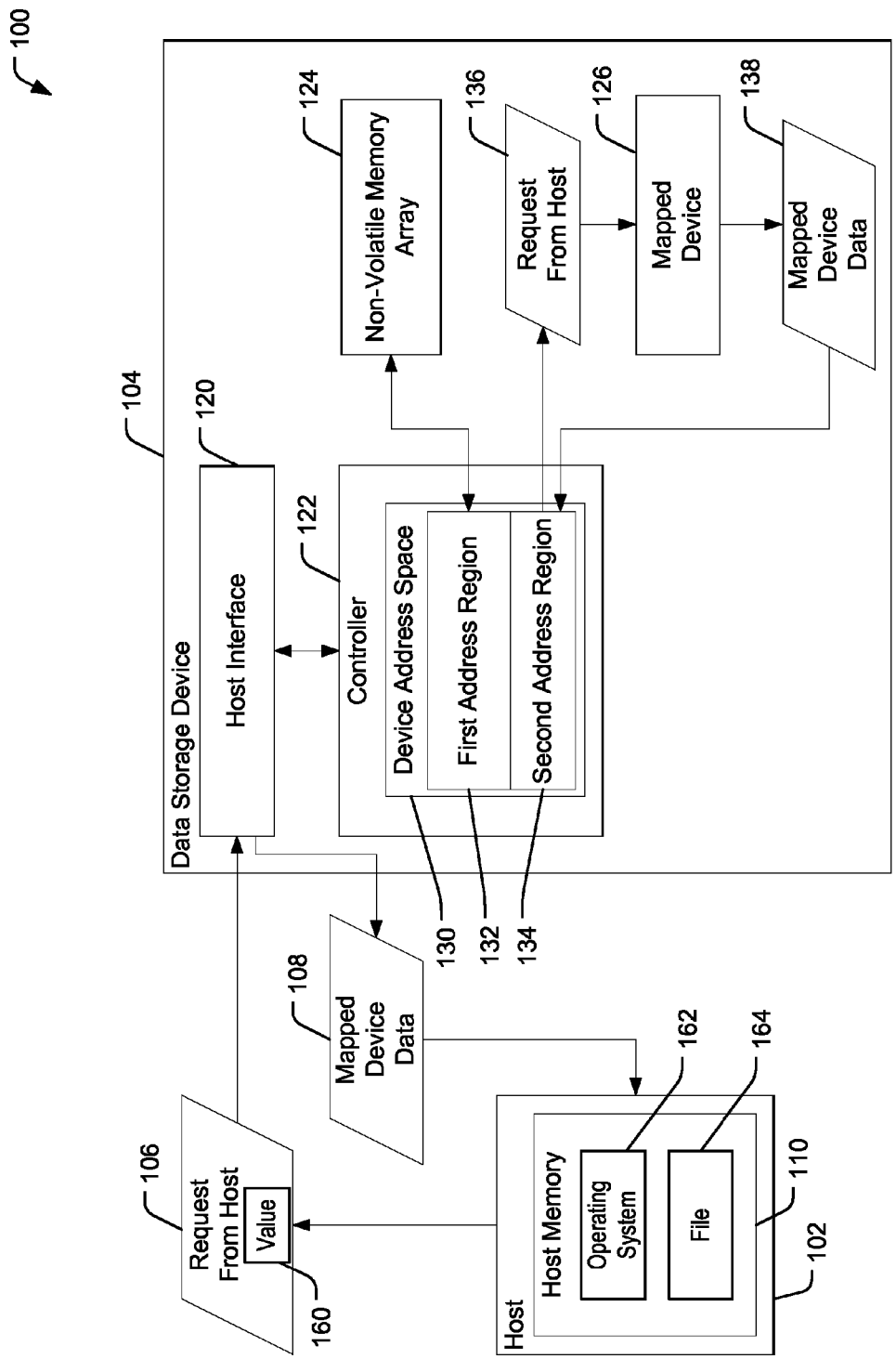
FIG. 1 is a block diagram of a first particular embodiment of a system to map a host access request.

Referring to FIG. 1, a particular embodiment of a system to map a host access request is depicted and generally designated 100. The system 100 includes a host 102 coupled to a data storage device 104. The data storage device 104 includes a controller 122 and a device address space 130 that includes a first address region 132 and a second address region 134. The controller 122 is configured to respond to requests for access to the first address region 132 by initiating memory operations at a memory array, such as a non-volatile memory array 124, and to respond to requests for access to the second address region 134 by mapping the memory access requests to a mapped device 126. Because the first address region 132 corresponds to addressable memory at the non-volatile memory array 124 but the second address region 134 may not correspond to addressable memory at the non-volatile memory array 124, the device address space 130 may include a range of addresses that exceeds an addressable amount of memory of the non-volatile memory array 124.

In a particular embodiment, the host 102 includes a memory 110 that is addressable by a host memory address space. The host 102 may have an operating system 162. In some embodiments, the host 102 may also include at least one file 164 in the host memory address space. The host 102 is configured to generate one or more requests 106 for the data storage device 104. For example, the request 106 may send a setting or value to the mapped device 126 of the data storage device 104 or may request a status or value from the mapped device 126 of the data storage device 104. The host 102 is further configured to receive data from the data storage device 104, such as mapped device data 108 that includes data generated by the mapped device 126.

The data storage device 104 includes a host interface 120, the controller 122, the non-volatile memory array 124, and the mapped device 126. The host interface 120 is adapted to couple the data storage device 104 to the host 102. In a particular embodiment, the host interface 120 includes a universal serial bus (USB) interface that is detachable from the host 102. Although the host interface 120 is depicted as separate from the controller 122, in other embodiments at least a portion of the host interface 120 is a component of the controller 122.

In a particular embodiment, the non-volatile memory array 124 includes a flash memory array. The non-volatile memory array 124 is addressable via the first address region 132 of the device address space 130. In a particular embodiment, the device address space 130 is independent from the host memory address space. The device address space 130 includes the first address region 132 and the second address region 134. The first address region 132 is mapped to memory locations of the non-volatile memory array 124 for data storage and retrieval. For example, a storage request received from the host 102 to the first address region 132 is mapped by the controller 122 to a memory storage operation at the non-volatile memory array 124. The second address region 134 corresponds to the mapped device 126 and is distinct from the first address region 132. As illustrated, the second address region 134 includes a memory address region beyond a useable memory sector of the non-volatile memory array 124. As used herein, a "usable memory sector" of the non-volatile memory array 124 is a sector of the non-volatile memory array 124 that is user visible or user accessible, such as a sector in a public area of the non-volatile memory array 124 or a sector in a non-public area that is accessible to a user after an authentication or authorization process, as illustrative, non-limiting examples. In a particular embodiment, the first address region 132 may correspond to all usable memory sectors (i.e. memory sectors that are user visible or user accessible) of the non-volatile memory array 124, and no memory addresses within the second address region 134 may correspond to a usable location of the memory array 124. In another embodiment, at least one usable sector of the non-volatile memory array 124 is accessible via the second address region 134 but is not accessible via the first address region 132.

In a particular embodiment, the second address region 134 is associated with memory within a hidden storage area. A hidden storage area may include a portion of the non-volatile memory array 124 that is not usable for storing user data and not visible to the host 102 as part of a file system. For example, the hidden storage area may include at least one of a U3 hidden area, a TrustedFlash™ hidden area, a TrustedFlash™ Secure Data Object (SDO), and a storage location addressable by an Institute of Electrical and Electronics Engineers IEEE 1667 Silo Command.

The controller 122 is configured to receive requests from the host 102 via the host interface 120 and to control read and write access to the non-volatile memory array 124. The controller 122 is also configured to selectively map read and write requests from the host 102 to the mapped device 126. For example, when the request 106 includes a request for write access to the second address region 134, the controller 122 may be adapted to, in response to the request 106, direct a request 136 to the mapped device 126 as a request from the host. The request 136 may include settings or values to be applied to the mapped device 126, such as a value 160 provided by the host 102 with the request 106. As another example, when the request 106 includes a request for read access to the second address region 134, the controller 122 may be adapted to, in response to the request 106, direct the request 136 to the mapped device 126, the request 136 including a request for data corresponding to the mapped device 126.

In a particular embodiment, the controller 122 is configured to store data received via the request 106, such as the value 160, at the non-volatile memory array 124 and to provide the stored data to the mapped device 126 during an initialization process. For example, the controller 122 may store settings for the mapped device 126 at a memory location of the non-volatile memory array 124 that corresponds to the first address region 132 or to the second address region 134 and may provide the stored settings to the mapped device 126 during a power-on process.

The mapped device 126 provides functionality that is not provided by the universal serial bus (USB) Mass Storage Class access to the first address region 132. For example, the mapped device 126 may include a user input device, a printer, a scanner, a camera, a buzzer, a light emitting diode (LED), an alarm, a smart card, a temperature sensor, a light sensor, a chemical sensor, an analog-to-digital converting device, a clock, a timer, an accelerometer, a switch, a relay, or a digital-to-analog converting device. In a particular embodiment, the mapped device 126 is a bus controller, such as a controller for a Peripheral Component Interconnect (PCI) bus, an Inter-Integrated Circuit (I²C) bus, a OneWire™ bus, a serial bus, a parallel bus, any other bus type, or any combination thereof.

During operation, the data storage device 104 may be configured to provide a value of the mapped device 126 in response to a request for read access to the second address region 134 from the host 102. The data storage device 104 may also be configured to set values of the mapped device 126 in response to a request for write access to the second address region 134 from the host 102. Thus, the data storage device 104 may be accessible to the host 102 as a single endpoint and as a mass storage class (MSC) device by providing access to the mapped device 126 via memory mapping. In a USB implementation, the host 102 can access functionality of the non-volatile memory array 124 using a MSC device class and can also access non-MSC functionality of the mapped device 126 without installing an additional USB device class driver for the mapped device 126. USB device classes can utilize multiple logical channels or "pipes" for communication, with each pipe assigned to a corresponding endpoint at the USB device. In USB implementations, a total number of pipes available to a device may be limited, and each pipe may require a buffer at the host 102 or at the data storage device 104 to buffer data for transport via the USB bus. By implementing a MSC device class for the data storage device 104 and enabling access to the mapped device 126 via memory mapping, a number of pipes, device drivers, and buffers may be reduced as compared to implementing multiple device classes.

To illustrate, in a particular embodiment, when the request 106 is a write request including the value 160 to be written to the second address region 134, the controller 122 uses the value 160 to adjust one or more parameters of the mapped device 126. When the request 106 is a read request to read the second address region 134, the controller 122 interprets the request 106 as an instruction to read data from the mapped device 126 and sends the request 136 to the mapped device. The mapped device 126 may provide a value of the mapped device 126 as mapped device data 138 in response to the read request 136.

For example, a value that is provided as mapped device data 138 may include a status indicator, a switch setting, or any other device information. The mapped device data 138 may be provided to the controller 122 from the mapped device 126, and the controller 122 may be configured to send the mapped device data 138 as the mapped device data 108 to the host 102.

In another embodiment, the mapped device data 138 may be stored at the non-volatile memory array 124. For example, in an embodiment where the second address region 134 is associated with usable memory of the non-volatile memory array 124, the mapped device data 138 may be stored at the second address region 134 to be retrieved by the host 102 via a memory read request to access the second address region 134. As another example, such as when the second address region 134 does not correspond to usable memory, the mapped device data 138 may be stored at the first address region 132. The location of the mapped device data 138 at the first address region 132 may be known by the host 102 and accessible via a memory read request to the specific location initiated by the host 102. Alternatively, the controller 122 may manage retrieval of the mapped device data 138 from the first address region 132 in a manner that is transparent to the host 102.

In a particular embodiment, the second address region 134 is accessed indirectly by the host 102 using the file 164. The file 164 may be associated with the second address region 134 by the operating system 162 of the host 102. In another embodiment, the second address region 134 is accessed directly by the host 102 without use of the file 164.

In a particular implementation, a command from the host 102 is mapped by the controller 122 to the mapped device 126 which is external to the non-volatile memory array 124. The command may be communicated in compliance with a security protocol, and the controller 122 receives an identifier associated with the mapped device 126 device from the host 102. In a particular embodiment, the security protocol is a small computer system interface (SCSI) protocol. The command may be compliant with Institute of Electrical and Electronics Engineers IEEE Std. 1667.

For example, the data storage device 104 may include an Addressable Content Target (ACT) that includes a first silo compliant with IEEE 1667. A probe command may return a silo type identifier for each silo implemented in the ACT to the host 102, including a silo type identifier for a second silo that is used for the mapped device 126. The host 102 can determine the presence of the mapped device 126 via the silo type identifier of the second silo and can further determine commands defined for the silo type to provide an interface to access the Second Address Region 134.

In a SCSI security protocol implementation, the host 102 may generate the request 106 including a SCSI Security Protocol Out command identifying the silo of the mapped device, a device command that is supported by the silo type, and may include one or more values such as the value 160. The controller 122 may interpret the request 106 and provide the device command to the mapped device 126 via the request 136. The host 102 may also send a SCSI Security Protocol In command to the data storage device 104. The Security Protocol In command may be interpreted by the controller 122 as a request to read the mapped device data 138 that is provided in response to the device command. The controller 122 may initiate sending the mapped device data 108 to the host 102 in a format specified by the silo type of the mapped device 126. In an embodiment where the data storage device 104 includes or supports multiple devices such as peripherals, the non-volatile memory array 124 may include multiple silo types associated with the devices to enable access by the host 102 and/or a single silo type associated with multiple devices.

As will be discussed with respect to FIG. 3, the device address space 130 may further include one or more additional address regions. For example, the device address space 130 may include a third address region, and a request from the host 102 to access the third address region may be mapped by the controller 122 to a second mapped device. As will be discussed with respect to FIG. 4, the mapped device 126 may be a first external device that is coupled to the data storage device 104 via a device interface, and the second mapped device may be a second external device that is coupled to the data storage device 104 via a second device interface.

By enabling host access to the non-volatile memory array 124 and also enabling host access to the mapped device 126 by mapping access requests for the second address region 134 to the mapped device 126, multiple components of the data storage device 102 of different device classes are accessible to the host 102 using a single connection endpoint. For example, in a USB implementation, both the non-volatile memory array 124 and the mapped device 126 are accessible via a single MSC device interface. Such an implementation may reduce a number of USB endpoints and buffers that may be required to support the mapped device 126 as a separate USB class.

Figure 2:
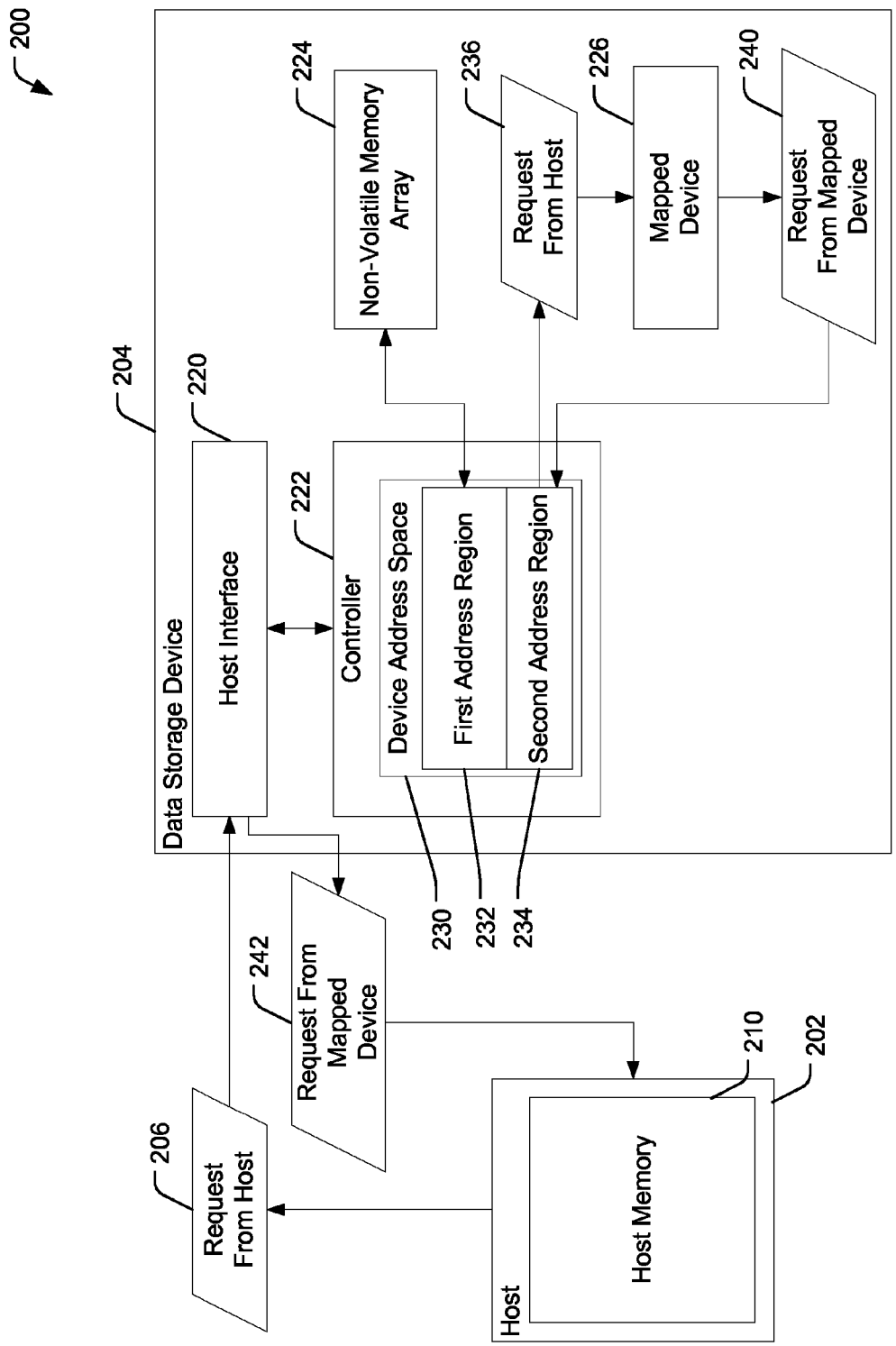
FIG. 2 is a block diagram of a second particular embodiment of a system to map a host access request.

Referring to FIG. 2, a second particular embodiment of a system to map a host access request is depicted and generally designated 200. The system 200 includes a host 202 coupled to a data storage device 204. The host 202 includes a host memory 210 that is addressable by a host memory address space. The data storage device 204 includes a device address space 230 that is independent from the host memory address space. The device address space 230 includes a first address region 232 that is mapped to a non-volatile memory array 224 and a second address region 234 that is mapped to a mapped device 226. In a particular embodiment, one or more components of the system 200 may operate substantially similarly to corresponding components of the system 100 of FIG. 1.

The mapped device 226 is accessible to the host 202 via a request 206 to access the second address region 234. A controller 222 is configured to identify the request 206 as a write or read request to the second address region 234 and to send a request 236 to the mapped device 226. When the request 206 is a write request, the request 236 may set parameters of the mapped device 226. When the request 206 is a read request, the request 236 may indicate a request for a value of settings or other data from the mapped device 226.

The mapped device 226 is configured to generate a request 240 to be sent to the host 202. The request 240 may include a request to access the second address region 234. The request 240 may be mapped by the controller 222 to the host 202, and the controller 222 may initiate sending a request 242 to the host 202 via a host interface 220. The request 242 may correspond to the request 240.

In a particular embodiment, the request 240 may be stored at the non-volatile memory array 224 to be accessed by the host 202 during a memory read request. In another embodiment, such as where the host interface 220 includes a USB 3.0 interface that enables USB devices to send requests to a USB host, the request 240 may be provided by the mapped device 226 to the controller 222, and the controller 222 may initiate sending the request 242 the host 202 via the host interface 220.

Figure 3:
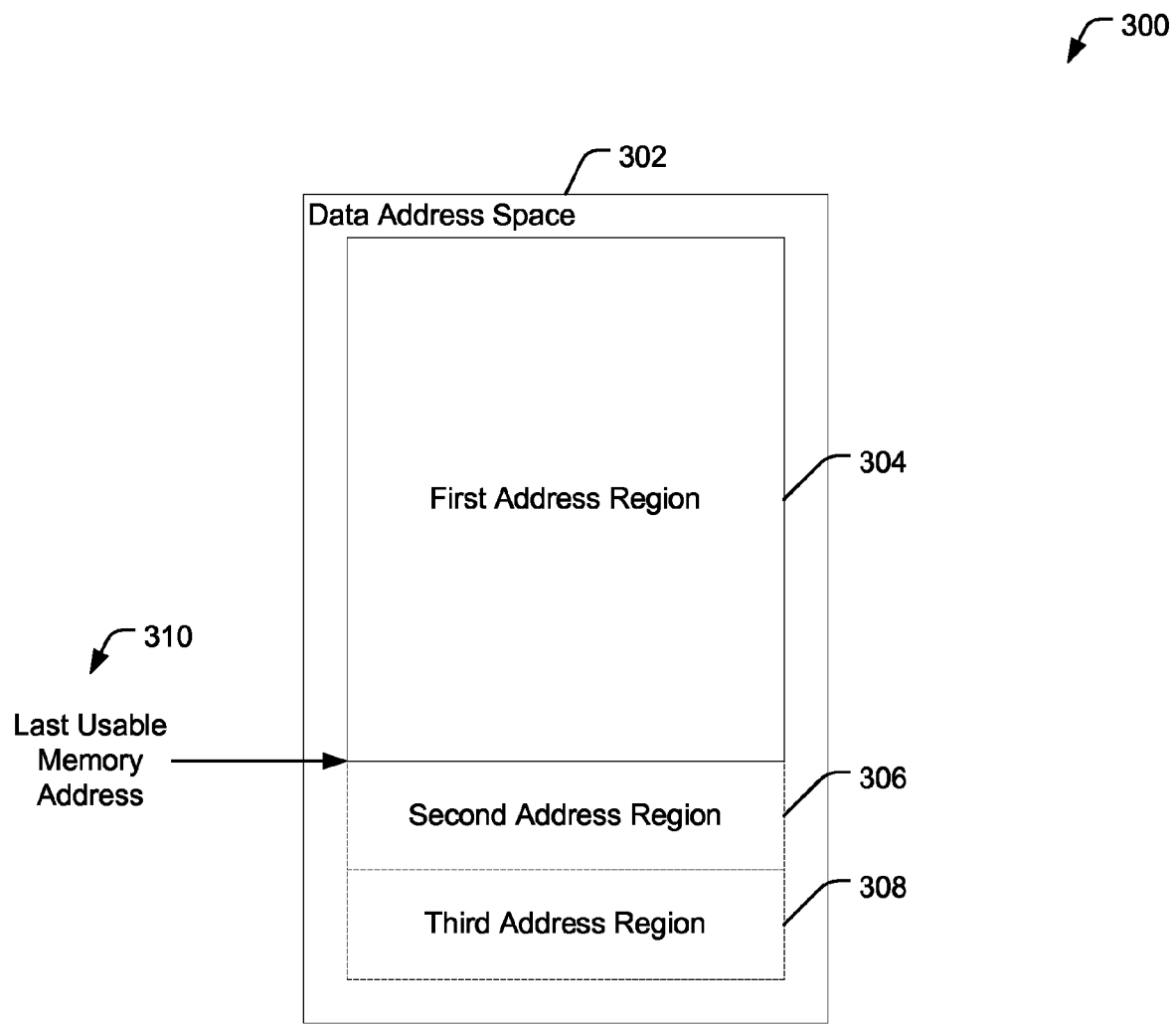
FIG. 3 is a diagram illustrating a data address space of a system to map a host access request.

Referring to FIG. 3, a particular embodiment of a system to map a memory request is depicted and generally designated 300. The system 300 includes a data address space 302 including a first address region 304, a second address region 306, and a third address region 308. The first address region 304 may include a range of addresses corresponding to usable physical memory in a data storage device, such as the data storage device 104 of FIG. 1 or the data storage device 204 of FIG. 2. The second address region 306 and the third address region 308 are past a last usable memory address 310.

The second address region 306 may be mapped by a memory controller as corresponding to a particular device that is external to the physical memory, such as the mapped device 126 of FIG. 1 or the mapped device 226 of FIG. 2. Similarly, the third address region 308 may be identified by a memory controller as being mapped to a second device. Although FIG. 3 depicts a second address region 306 and a third address region 308, in other embodiments the data address space 302 may include a single address region past the last usable memory address 310, or three or more address regions beyond the last usable memory address 310.

In a USB implementation, the data address space 302 may correspond to a memory device that is accessed via a USB MSC device interface. Multiple devices that are external to the memory may be mapped such that they are accessible by a host device without being added as USB devices.

Figure 4:
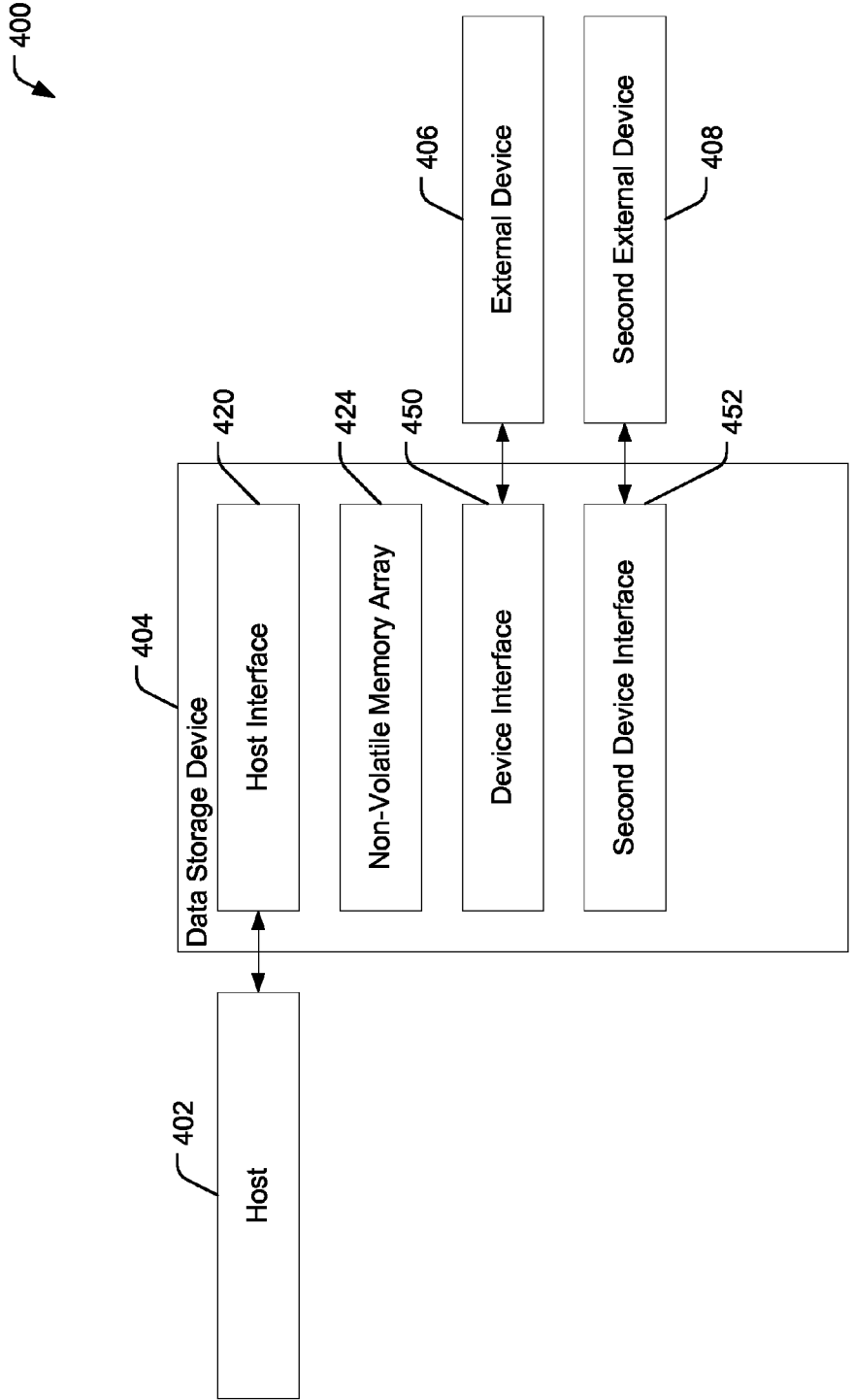
FIG. 4 is a diagram illustrating a particular embodiment of a system to map a host access request to an external device.

Referring to FIG. 4, a particular embodiment of a system to map a host access request is depicted and generally designated 400. The system 400 includes a host 402 coupled to a data storage device 404. The data storage device 404 is coupled to an external device 406 and to a second external device 408, such as one or more peripheral devices. In an illustrative embodiment, the data storage device 404 is the data storage device 104 of FIG. 1 or the data storage device 204 of FIG. 2.

In a particular embodiment, the data storage device 404 includes a host interface 420, a non-volatile memory array 424, a device interface 450, and a second device interface 452. The host interface 420 is configured to couple the data storage device 404 to the host 402. The host interface 420 is also configured to enable the host 402 to send memory access requests to the data storage device 404. The host interface 420 is further configured to provide data to the host 402, such as data retrieved from the non-volatile memory array 424, data retrieved via the device interface 450, or data retrieved via the second device interface 452. In a particular embodiment, the host interface 420 includes a USB interface that is adapted to detachably couple the data storage device 404 to the host 402.

In a particular embodiment, the device interface 450 is adapted to couple to the external device 406, and the second device interface 452 is adapted to couple to the second external device 408. The host interface 420 may implement a USB interface and the data storage device 404 may enable the host 402 to access the external device 406 and the second external device 408 by mapping access requests to the non-volatile memory array 424. Thus, the device interface 450 and the second device interface 452 do not represent USB endpoints.

In a particular embodiment, the data storage device 404 is configured to map commands from the host 402 to the non-volatile memory array 424, or to the external device 406 or the second external device 408, without implementing the first external device 406 and the second external device 408 as additional USB devices. For example, the first external device 406 and the second external device 408 may be accessed by memory access requests sent from the host 402 to address ranges that are mapped to the first external device 406 and the second external device 408, respectively. For example, the non-volatile memory array 424 may be addressable by the data address space 302 of FIG. 3 such that the external device 406 is accessible via an access request to the second address region 306 and the second external device 408 is accessible via an access request to the third address region 308.

Figure 5:
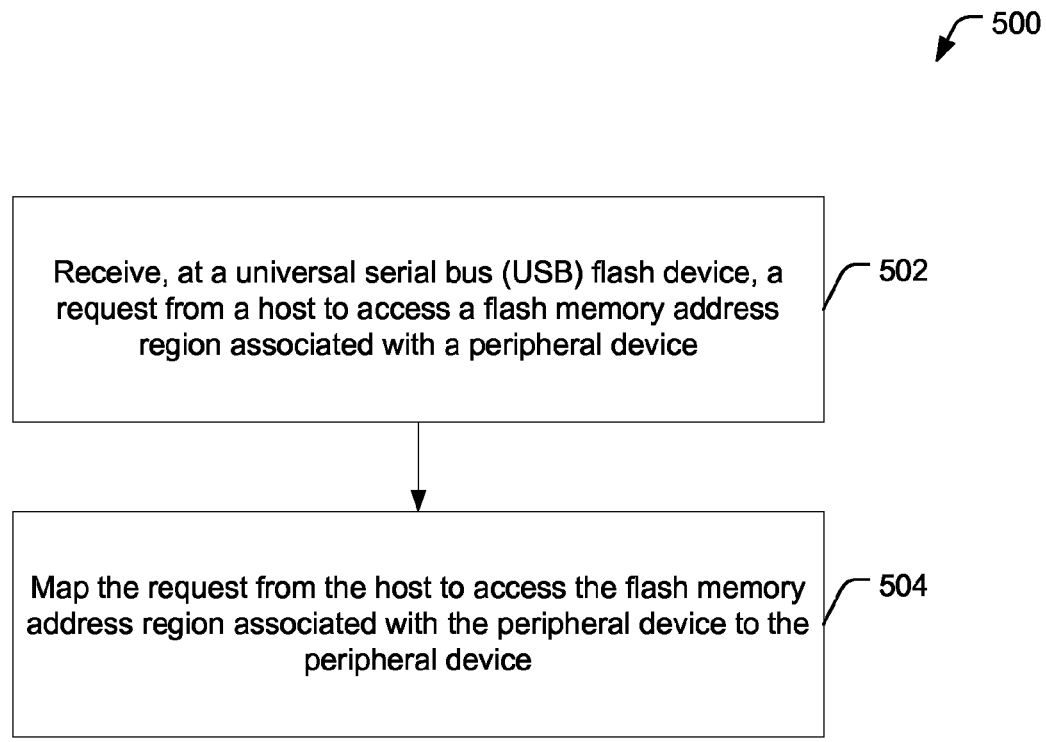
FIG. 5 is a flow diagram of a first particular embodiment of a method of mapping a host access request.

Referring to FIG. 5, a first particular embodiment of a method of mapping a host access request is depicted and generally designated 500. In a particular embodiment, the method 500 may be performed by the data storage device 104 of FIG. 1, the data storage device 204 of FIG. 2, or the data storage device 404 of FIG. 4.

At 502, a request from a host to access a flash memory address region associated with a peripheral device is received at a Universal Serial Bus (USB) flash device. For example, the flash memory address region may correspond to the second address region 134 of the data storage device 104 of FIG. 1, and the peripheral device may correspond to the mapped device 126 of FIG. 1. In another particular embodiment, the peripheral device may correspond to the external device 406 of FIG. 4.

Advancing to 504, the request from the host to access the flash memory address region associated with the peripheral device is mapped to the peripheral device. For example, when the request is a write request, the request may be mapped as a command sent to the peripheral device to set parameters at the peripheral device. As another example, when the request is a read request, the request may be mapped as a command sent to the peripheral device to read configuration or status information of the peripheral device.

Thus, the host can access the peripheral device using requests to access a memory within the device address space, and the requests are mapped to the peripheral device. As a result, a USB device interface for the peripheral device need not be supported to enable access by the host.

Figure 6:
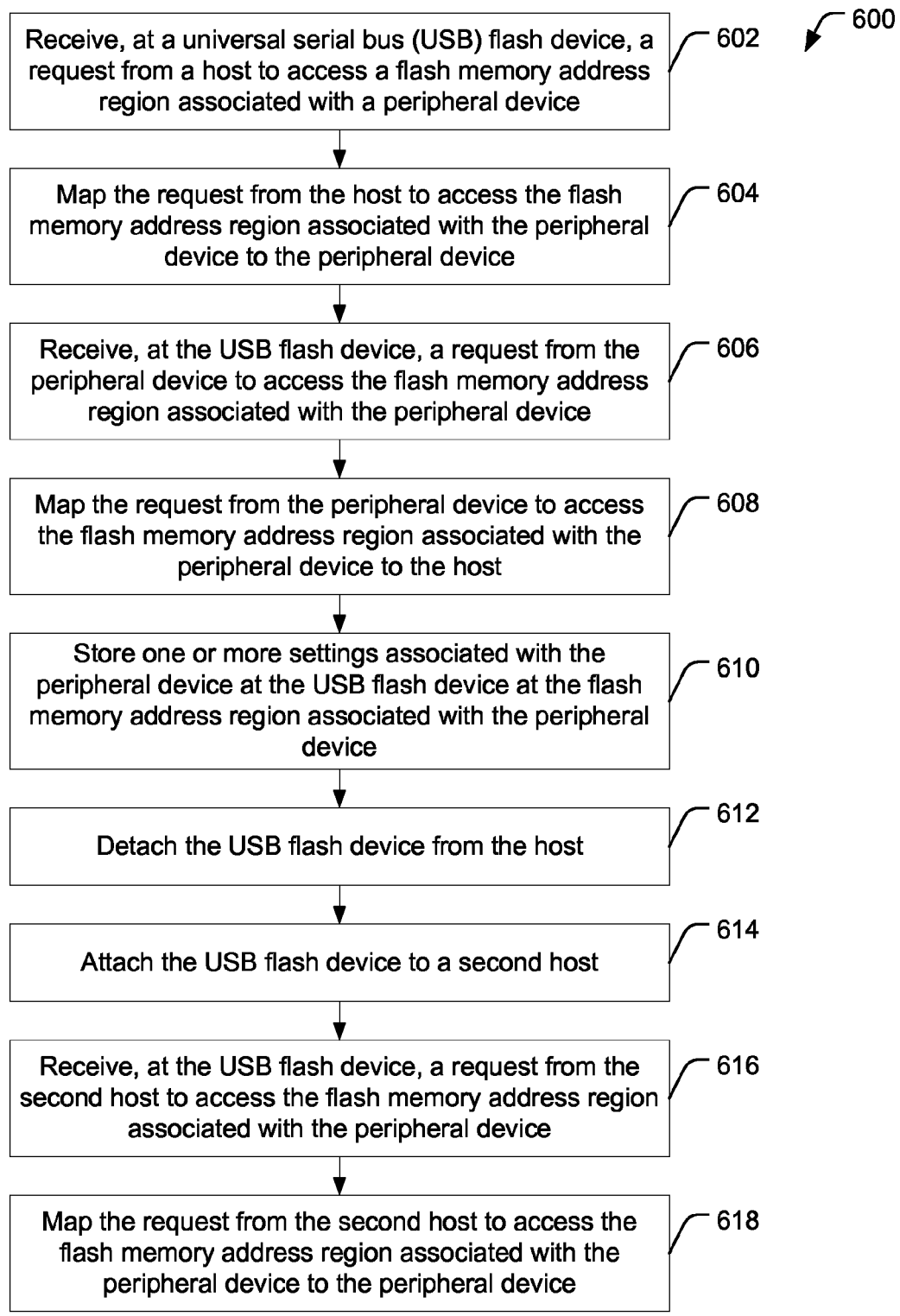
FIG. 6 is a flow diagram of a second particular embodiment of a method of mapping a host access request.

Referring to FIG. 6, a second particular embodiment of a method of mapping a host access request is depicted and generally designated 600. The method 600 includes, at 602, receiving, at a Universal Serial Bus (USB) flash device, a request from a host to access a flash memory address region associated with a peripheral device. The USB flash device includes a memory array associated with a memory array address space. The flash memory address region associated with the peripheral device is outside the memory array address space. For example, the request may be received at the data storage device 104 of FIG. 1, the data storage device 204 of FIG. 2, or the data storage device 404 of FIG. 4.

Advancing to 604, the request from the host to access the flash memory address region associated with the peripheral device is mapped to the peripheral device. In a particular embodiment, the flash memory address region associated with the peripheral device is accessible to the host as a single end point and as a mass storage class (MSC) device.

Moving to 606, a request from the peripheral device to access the flash memory address region associated with the peripheral device may be received at the USB flash device. Proceeding to 608, the request from the peripheral device to access the flash memory address region associated with the peripheral device may be mapped to the host. In a particular embodiment, the request from the peripheral device is the request 240 that is mapped to host 202 via the request 242 of FIG. 2.

Continuing to 610, one or more settings associated with the peripheral device may be stored at the USB flash device at the flash memory address region associated with the peripheral device. Advancing to 612, the USB flash device may be detached from the host, and moving to 614, the USB flash device may be attached to a second host. Proceeding to 616, a request from the second host to access the flash memory address region associated with the peripheral device may be received at the USB flash device. Continuing to 618, the request from the second host to access the flash memory address region associated with the peripheral device may be mapped to the peripheral device. Thus, the USB flash device may enable multiple hosts to access the peripheral device by mapping requests to access the flash memory address region associated with the peripheral device.

Figure 7:
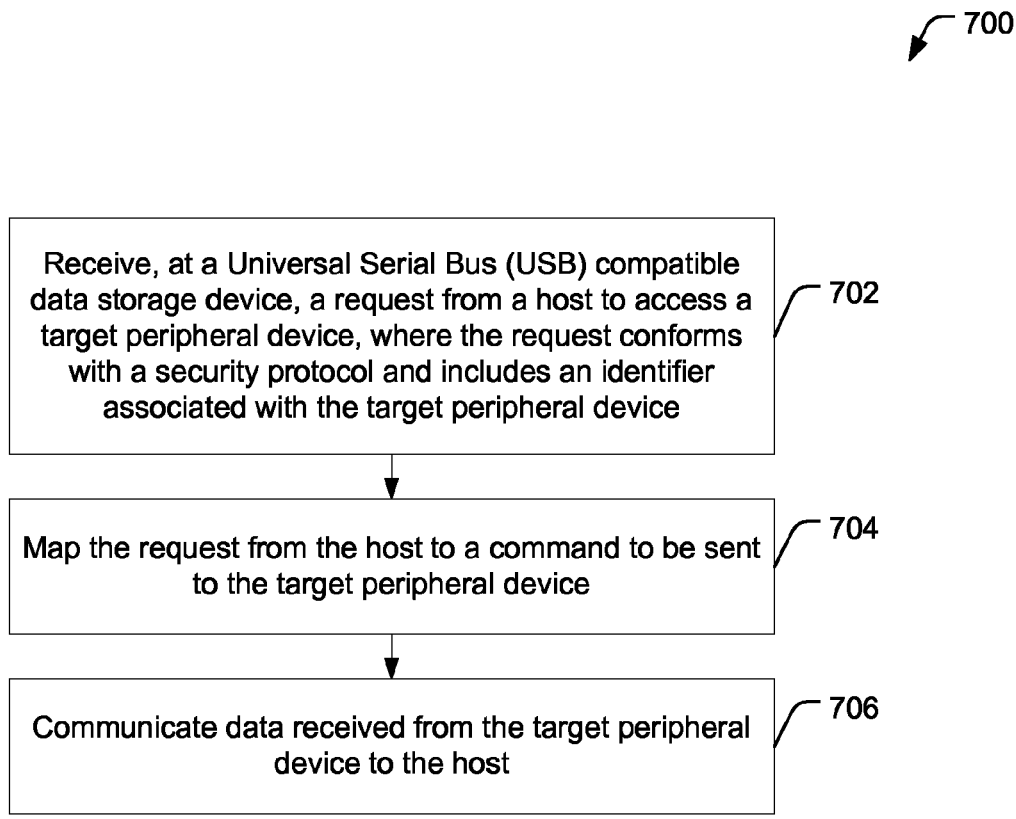
FIG. 7 is a flow diagram of a third particular embodiment of a method of mapping a host access request.

Referring to FIG. 7, a third illustrative embodiment of a method of mapping a host access request is depicted and generally designated 700. At 702, a request from a host to access a target peripheral device is received at a Universal Serial Bus (USB) compatible data storage device, where the request conforms with a security protocol and includes an identifier associated with the target peripheral device. The data storage device may be a mass storage device, such as a flash device.

The security protocol may be small computer system interface (SCSI) compatible. For example, the request from the host may include one of an In command and an Out command of a small computer system interface (SCSI) security protocol. The request may be compliant with Institute of Electrical and Electronics Engineers IEEE Std. 1667.

In a particular embodiment, the identifier is a silo type identifier. The identifier may indicate a silo type corresponding to a type of the target peripheral device. For example, the silo type may correspond to a light emitting diode (LED).

Continuing to 704, the request from the host is mapped to a command to be sent to the target peripheral device. Advancing to 706, data received from the target peripheral device is communicated to the host. The data may be communicated using an Out command a SCSI security protocol.

By using the request conforming with the security protocol, the host may communicate with the target peripheral device via the data storage device without the data storage device implementing a USB device interface for the target peripheral device. For example, the data storage device may be a flash memory device that is accessible to the host as a single endpoint and as a mass storage class (MSC) device, while enabling the host to access the target peripheral device.

Although various components depicted herein are illustrated as block components and described in general terms, such components may include one or more microprocessors, state machines, or other circuits configured to enable the data storage device 104 of FIG. 1 or the data storage device 204 of FIG. 2 to perform the particular functions attributed to such components, or any combination thereof. For example, the host interface 120, the controller 122, or both, of FIG. 1 may represent physical components, such as controllers, state machines, logic circuits, or other structures to enable the data storage device 104 to receive and respond to data requests from a host device or from other external devices by mapping the host requests to the second address region 134 to the mapped device 126.

For example, the controller 122 of FIG. 1 may be implemented using a microprocessor or microcontroller programmed to determine whether a memory access request from a host corresponds to the second address region 134 and to send the request to the mapped device 126 when the request corresponds to the second address region 134. In a particular embodiment, the controller 122 of FIG. 1 includes executable instructions that are executed by a processor and the instructions are stored at the memory array 124. Alternatively, or in addition, executable instructions that are executed by the processor may be stored at a separate memory location that is not part of the memory array 104, such as at a read-only memory (ROM) (not shown) at the controller 122.

In a particular embodiment, the data storage device 104 may be a portable device configured to be selectively coupled to one or more external devices. However, in other embodiments, the data storage device may be attached or embedded within one or more host devices, such as within a housing of a portable communication device. For example, the data storage device may be within a packaged apparatus such as a wireless telephone, personal digital assistant (PDA), gaming device or console, portable navigation device, or other device that uses internal non-volatile memory. In a particular embodiment, the data storage device 104 includes a non-volatile memory, such as a flash memory (e.g., NAND, NOR, Multi-Level Cell (MLC), Divided bit-line NOR (DINOR), AND, high capacitive coupling ratio (HiCR), asymmetrical contactless transistor (ACT), or other flash memories), an erasable programmable read-only memory (EPROM), an electrically-erasable programmable read-only memory (EEPROM), a read-only memory (ROM), a one-time programmable memory (OTP), or any other type of memory.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description. Accordingly, the disclosure and the figures are to be regarded as illustrative rather than restrictive.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A data storage device, comprising:
  a host interface, wherein the host interface is adapted to couple the data storage device as a single endpoint and as a device of a mass storage class to a host, the host including memory that is addressable by a host memory address space;
  a device address space that is independent from the host memory address space, the device address space including a first address region and a second address region, wherein the second address region is distinct from the first address region;
  a non-volatile memory; and
  a controller coupled to the non-volatile memory and further coupled to a mapped device that is external to the non-volatile memory, wherein the mapped device includes functionality that is not provided by the mass storage class,
  wherein the controller is adapted to, in response to a first request from the host for access to the first address region of the device address space, perform a memory access operation at the non-volatile memory, and
  wherein the controller is further adapted to, in response to a second request from the host for access to the second address region of the device address space, map the second request to the mapped device to enable host access to the functionality of the mapped device via the single endpoint.

2. The data storage device of claim 1, wherein the data storage device provides a value of the mapped device in response to a request for read access to the second address region.

3. The data storage device of claim 2, wherein the controller uses the value to adjust one or more parameters of the mapped device in response to a request for write access to the second address region.

4. The data storage device of claim 3, wherein the controller is configured to store data received via the request for write access to the second address region at the non-volatile memory and to provide the stored data to the mapped device during an initialization process.

5. The data storage device of claim 1, wherein a request from the mapped device to access the second address region is mapped by the controller to the host.

6. The data storage device of claim 1, wherein the host interface includes a Universal Serial Bus (USB) interface that is detachable from the host.

7. The data storage device of claim 1, wherein the non-volatile memory includes a flash memory.

8. The data storage device of claim 1, wherein the first address region is adapted to store data, and wherein a storage request is mapped by the controller to the first address region.

9. The data storage device of claim 1, wherein the second address region is associated with memory within a hidden storage area.

10. The data storage device of claim 1, wherein the second address region is accessed directly by the host.

11. The data storage device of claim 1, wherein the second address region is accessed indirectly by the host using at least one file associated with the second address region by an operating system of the host.

12. The data storage device of claim 1, wherein the device address space further comprises a third address region, and wherein a request from the host to access the third address region is mapped by the controller to a second mapped device.

13. The data storage device of claim 12, wherein the mapped device is a first external device that is coupled to the data storage device via a device interface, and wherein the second mapped device is a second external device that is coupled to the data storage device via a second device interface.

14. The data storage device of claim 1, wherein the mapped device is associated with a Universal Serial Bus (USB) class other than a mass storage class.

15. The data storage device of claim 14, wherein the mapped device includes one of a user input device, a printer, a scanner, a camera, a buzzer, a light emitting diode (LED), an alarm, a smart card, a temperature sensor, a light sensor, a chemical sensor, an analog-to-digital converting device, a clock, a timer, an accelerometer, a switch, a relay, and a digital-to-analog converting device.

16. The data storage device of claim 14, wherein the mapped device is a bus controller.

17. The data storage device of claim 1, wherein the device address space includes a range of addresses that exceeds an addressable amount of memory of the non-volatile memory.

18. The data storage device of claim 1, wherein the controller is coupled to a peripheral device associated with a peripheral memory address region that is outside of the device address space, and wherein the controller is further adapted to, in response to a third request from the host for access to the peripheral memory address region, map the third request to the peripheral device.

19. An apparatus comprising
a controller, wherein the controller is configured to be coupled to a non-volatile memory addressable by a first address region of a device address space that is independent from a host memory address space, the device address space including the first address region and a second address region;
wherein the controller is configured to receive a request to access the second address region from a host via a host interface, wherein the host interface is adapted to couple the apparatus as a single endpoint and as a device of a mass storage class to the host; and
wherein the controller is configured to map the request to a mapped device that is external to the non-volatile memory, wherein the controller is further configured to enable host access to functionality of the mapped device via the single endpoint, and wherein the functionality is not provided by the mass storage class.

20. The apparatus of claim 19, further comprising the non-volatile memory coupled to the controller.

21. A method, comprising:
receiving, at a Universal Serial Bus (USB) flash device, a request from a host to access a flash memory address region associated with a peripheral device, wherein the USB flash device includes a memory associated with a memory address space, and wherein the flash memory address region associated with the peripheral device is outside the memory address space;
mapping the request from the host to access the flash memory address region associated with the peripheral device to the peripheral device; and
storing data received via the request from the host to access the flash memory address region associated with the peripheral device at the memory and providing the stored data to the peripheral device during an initialization process.

22. The method of claim 21, wherein the flash memory address region associated with the peripheral device is accessible to the host as a single endpoint and as a mass storage class (MSC) device.

23. The method of claim 21, further comprising:
receiving, at the USB flash device, a request from the peripheral device to access the flash memory address region associated with the peripheral device; and
mapping the request from the peripheral device to access the flash memory address region associated with the peripheral device to the host.

24. The method of claim 21, further comprising storing one or more settings associated with the peripheral device at the USB flash device at the flash memory address region associated with the peripheral device.

25. The method of claim 24, further comprising:
detaching the USB flash device from the host;
attaching the USB flash device to a second host;
receiving, at the USB flash device, a request from the second host to access the flash memory address region associated with the peripheral device; and
mapping the request from the second host to access the flash memory address region associated with the peripheral device to the peripheral device.

26. A detachable Universal Serial Bus (USB) flash device, comprising:
a USB interface adapted to couple the detachable USB flash device as a single endpoint and as a device of a mass storage class to a host, the host including memory that is addressable by a host memory address space;
a device interface adapted to couple the detachable USB flash device to a peripheral device, wherein the device interface is different from the host interface;
a flash memory associated with a first address region of a device address space; and
a controller coupled to the flash memory;
wherein the controller is adapted to, in response to a request from the host to access a second address region of the device address space, map the request from the host to the peripheral device via the device interface, wherein the second address region is distinct from the first address region, wherein the peripheral device includes functionality that is not provided by the mass storage class, and
wherein the controller is further adapted to, in response to a request from the peripheral device to access the second address region, map the request from the peripheral device to the host via the USB interface to enable host access to the functionality of the peripheral device via the single endpoint.

27. A data storage device, comprising:
a host interface, wherein the host interface is adapted to couple the data storage device as a single endpoint and as a device of a mass storage class to a host, the host including memory that is addressable by a host memory address space;

a device address space that is independent from the host memory address space, the device address space including a first address region and a second address region, wherein the second address region is distinct from the first address region;

a non-volatile memory having a useable memory sector and a non-useable memory sector; and a controller coupled to the non-volatile memory and further coupled to a mapped device that is external to the non-volatile memory, wherein the mapped device includes functionality that is not provided by the mass storage class, wherein the controller is adapted to, in response to a first request from the host for access to the first address region of the device address space, perform a memory access operation at the useable memory sector, and wherein the controller is further adapted to, in response to a second request from the host for access to the second address region of the device address space, map the second request to the non-useable memory sector and to enable host access to the functionality of the mapped device via the single endpoint.

28. The data storage device of claim 27, wherein the second address region is associated with memory within a hidden storage area.

29. The data storage device of claim 28, wherein the hidden storage area includes at least one of a U3 hidden area, a TrustedFlash hidden area, a TrustedFlash secure data object (SDO), and a storage location addressable by an Institute of Electrical and Electronics Engineers IEEE 1667 Silo Command.

30. The data storage device of claim 27, wherein the data storage device provides a value of the mapped device in response to a request for read access to the second address region.

31. A data storage device, comprising:

a host interface, wherein the host interface is adapted to couple the data storage device as single endpoint and as a device of a mass storage class to a host;

a device address space including a first address region and a second address region, wherein the second address region is distinct from the first address region;

a non-volatile memory; and a controller coupled to the non-volatile memory, wherein the controller is further coupled to an external device, and wherein the external device includes functionality that is not provided by the mass storage class;

wherein the controller is adapted to, in response to a first request from the host for access to the first address region of the device address space, perform a memory access operation at the non-volatile memory, and wherein the controller is further adapted to, in response to a second request from the host for access to the second address region of the device address space, map the second request to the external device to enable host access to the functionality of the external device via the single endpoint.

32. The data storage device of claim 31, wherein the device address space includes a range of addresses that exceeds an addressable amount of memory of the non-volatile memory.

33. The data storage device of claim 31, wherein the data storage device provides a value of the external device in response to a request for read access to the second address region.

34. The data storage device of claim 33, the controller uses the value to adjust one or more parameters of the external device in response to a request for write access to the second address region.

35. The data storage device of claim 31, wherein a request from the external device to access the second address region is mapped by the controller to the host.

36. The data storage device of claim 31, wherein the host interface includes a Universal Serial Bus (USB) interface that is detachable from the host.

37. The data storage device of claim 31, wherein the data storage device is accessible to the host as a single endpoint and as a mass storage class (MSC) device.

38. The data storage device of claim 31, wherein the first address region is adapted to store data, and wherein a storage request is mapped by the controller to the first address region.

39. The data storage device of claim 31, wherein the device address space further comprises a third address region, and wherein a request from the host to access the third address region is mapped by the controller to a second external device.

40. The data storage device of claim 31, wherein the external device is coupled to the data storage device via a device interface, and wherein the second mapped device is a second external device that is coupled to the data storage device via a second device interface.

* * * * *